United States Patent [19]

Buckreus

[11] Patent Number: 5,154,352
[45] Date of Patent: Oct. 13, 1992

[54] PROPELLING NOZZLE FOR AN AIRCRAFT ENGINE

[75] Inventor: Werner Buckreus, Gauting, Fed. Rep. of Germany

[73] Assignee: MTU Motoren - und Turbinen-Union Munchen GmbH, Fed. Rep. of Germany

[21] Appl. No.: 691,417

[22] Filed: Apr. 25, 1991

[30] Foreign Application Priority Data

May 11, 1990 [DE] Fed. Rep. of Germany ....... 4015204

[51] Int. Cl.⁵ .......................... F02K 1/82; F02K 9/64
[52] U.S. Cl. .................... 239/127.1; 239/265.11; 60/271; 29/463; 29/527.1; 29/890.01
[58] Field of Search ............... 239/13, 127.1, 265.11; 60/271; 29/463, 527.1, 527.5, 890.01

[56] References Cited

U.S. PATENT DOCUMENTS

| | | | |
|---|---|---|---|
| 2,956,399 | 10/1960 | Beighley | 239/127.1 |
| 3,157,026 | 11/1964 | Lampert | 239/127.1 |
| 3,460,759 | 8/1969 | Gregory et al. | 239/127.1 |
| 3,595,025 | 7/1971 | Stockel et al. | 239/127.1 X |
| 3,690,103 | 9/1972 | Dederra et al. | 29/890.01 X |
| 3,723,214 | 3/1973 | Meraz, Jr. | 239/265.11 X |
| 3,980,105 | 9/1976 | Myskowski | 239/265.11 X |
| 4,078,604 | 3/1978 | Christl et al. | 239/127.1 X |
| 4,582,678 | 4/1986 | Niino et al. | 29/890.01 X |
| 4,909,032 | 3/1990 | Horiuchi et al. | 239/127.1 X |

FOREIGN PATENT DOCUMENTS

| | | |
|---|---|---|
| 2657497 | 6/1978 | Fed. Rep. of Germany ... 239/127.1 |
| 3535779 | 4/1987 | Fed. Rep. of Germany . |
| 61-58957 | 3/1986 | Japan . |
| 1268547 | 3/1972 | United Kingdom ............. 239/127.1 |

*Primary Examiner*—Andres Kashnikow
*Assistant Examiner*—William Grant
*Attorney, Agent, or Firm*—Evenson, Wands, Edwards, Lenahan & McKeown

[57] ABSTRACT

A propelling nozzle for an aircraft engine has an interior shroud of high thermal conductivity which is penetrated by a number of cooling ducts and is surrounded from the outside by a solid support shroud. A cast-in intermediate layer is provided between the interior shroud and the support shroud. This has the advantage that manufacturing tolerances of the interior shroud and of the support shroud may be compensated. Only very minimal demands must be made on the accuracy of shaping the interior shroud and the support shroud.

20 Claims, 1 Drawing Sheet

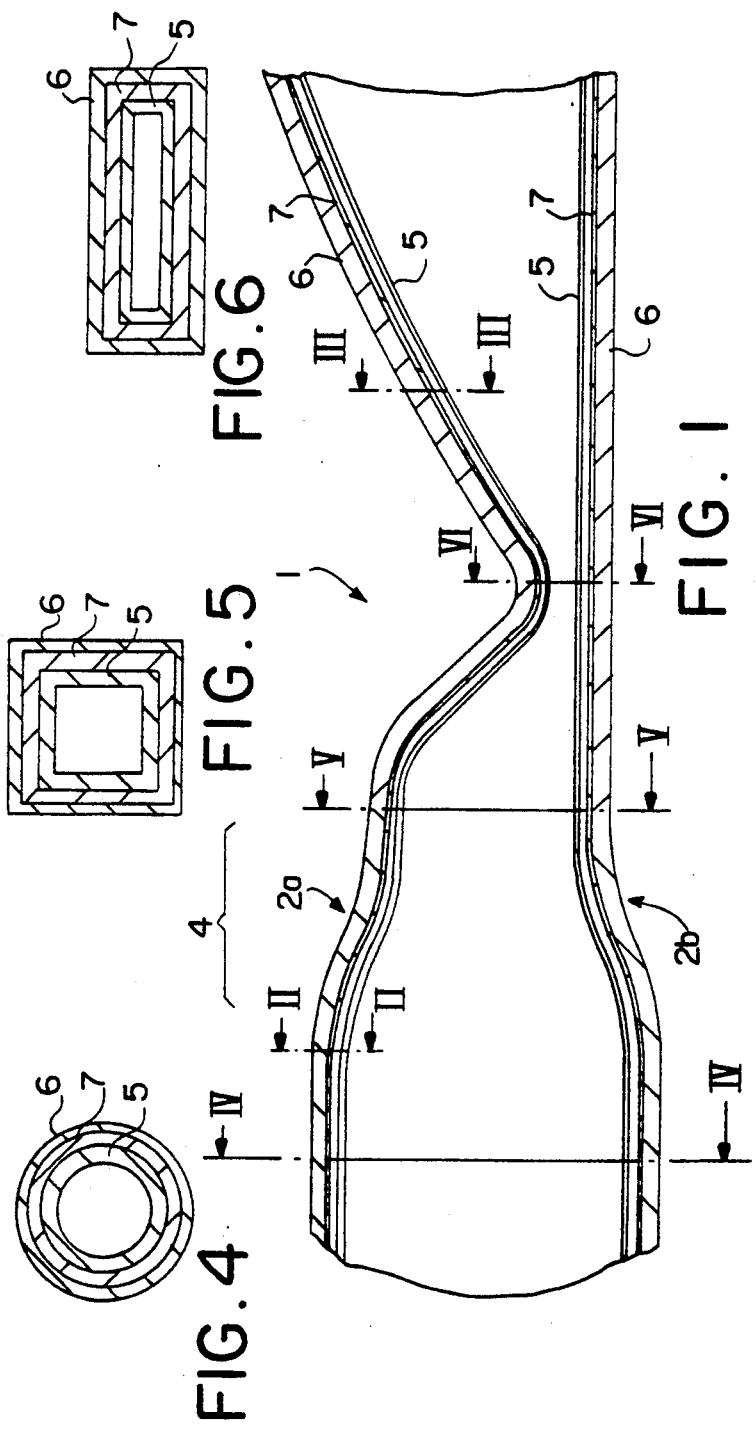

PROPELLING NOZZLE FOR AN AIRCRAFT ENGINE

BACKGROUND AND SUMMARY OF THE INVENTION

This invention relates to a propelling nozzle for an aircraft engine and, more particularly, to a propelling nozzle for an aircraft engine which has an interior shroud of high thermal conductivity penetrated by a number of cooling ducts and surrounded from the outside by a solid support shroud.

The previously known propelling nozzles which are used, for example, in rocket engines for carrier rockets or in the space shuttle have a rotationally symmetrical contour. In particular, the circular cross-section tapers from the combustion chamber in the direction of the narrow cross-section in order to subsequently again widen. This type of a rotationally symmetrical contour is very simple with respect to production techniques and permits an effective absorption of the gas forces.

However, because of the high temperature experienced of approximately 3,000° C., the propelling nozzle must be efficiently cooled. In this type of propelling nozzle, this is achieved by the construction which normally comprises an interior shroud consisting of a copper alloy in which cooling ducts are embedded in the circumferential direction or in the axial direction. These cooling ducts are cooled by a cooling medium, preferably the liquid hydrogen which is to be burnt in the propelling nozzle. On the outside, this interior shroud is surrounded without joints by a support shroud which absorbs the gas pressure forces. This support shroud must have a tensile strength that is as high as possible, while at the same time, because of the cooling arrangement disposed in the interior, the heat resistance is not very important.

Endeavors are currently being made to develop so-called hypersonic airplanes which also have a propelling nozzle of this type. The problem in the case of propelling nozzles for these airplanes is the required high efficiency during the thrust generation in which case several engines must be arranged next to one another. In order to meet these requirements, propelling nozzles are suggested having cross-sectional contour changes from the round cross-section in the area of the combustion chamber to the rectangular cross-section in the area of the nozzle outlet or even of the narrow cross-section of the nozzle.

This in turn means that the nozzle wall must have a design which is curved in a complicated manner. On the one hand, the relatively soft interior shroud must have an accurately shaped inside contour in order to achieve an optimal mass flow. On the other hand, the support shroud for reasons of stability, must be form-rigid to the extent that an adaptation to the shape of the interior shroud is not possible. However, with respect to production techniques, the manufacturing of the two shrouds with such a high accuracy of shape requires high expenditures because of the complicated geometry.

Nevertheless, it cannot be reliably excluded that, after the joining together of the two shrouds, hollow spaces may remain which during operation may result in deformations and cracks, and therefore in failures.

Based on the above, there is needed a propelling nozzle of this type as well as a process for manufacturing such a propelling nozzle which, while the production expenditures are low, permits the construction of a nozzle wall with high accuracy with respect to shape. At the same time, it is ensured that no hollow spaces remain between the two shrouds.

According to the present invention, these needs are met by a propelling nozzle for an aircraft engine which has an interior shroud of high thermal conductivity. The interior shroud is penetrated by a number of cooling ducts and is surrounded from the outside by a solid support shroud. A cast-in intermediate layer is provided between the interior shroud and the support shroud.

The principal advantages of the invention are that the manufacturing tolerances of the interior shroud and of the support shroud may be compensated. Instead of producing the two contours of the interior shroud and the interior contour of the support shroud with high expenditures and with high accuracy with respect to shape and, in addition, monitoring the joining of these shrouds with high testing expenditures only the interior contour of the interior shroud must be produced accurately with respect to shape. Concerning the other contours, very low requirements are advantageously sufficient. It is also an advantage that the surface quality of all surfaces does not exercise any influence except for the interior nozzle surface which normally also requires considerable working expenditures.

Finally, sensors, such as temperature measuring probes and pressure measuring probes, can be let into the nozzle shroud without weakening the support shroud. The sensors are cast into the intermediate layer. With low expenditures, all spaces between the interior shroud and the support shroud, including undercuts, can be filled in completely.

The whole shroud surface is supported by the support shroud in a manner which is accurate with respect to the measurements. Targeted characteristics of the shroud can be produced by the selection of a suitable material for the intermediate layer. Thus, it is possible to generate increased ductility or prestress, particularly when a material is chosen which expands in a targeted manner during solidification.

The intermediate layer preferably consists of a metal alloy, particularly an alloy in which bismuth and/or tin is the main constituent. These alloys have relatively low melting points and thus permit a casting-in with relatively low expenditures. Since the hydrogen cooling results in a very high cooling effect, the temperatures in the area of the intermediate layer may be kept very low so that there is no risk of melting during the operation. For example, tin - copper alloys may be used which have a melting point in the range of 220° C. Bismuth alloys have an even lower melting point. As an alternative, the use of cadmium alloys can result in the setting of a higher melting point in the range of approximately 300° C. Naturally, the use of higher-melting metals, such as copper, is also possible. However, in this case, increased precaution must be taken against the risk of thermal warping of the two shrouds during the casting-in. According to the selection of the constituents contained in the alloy, a defined solidification behavior can be established, i.e., an expansion for producing a specific prestress or no expansion for achieving an arrangement that is free of tension.

As an alternative, it is also possible to produce the intermediate layers from different materials, for example, from a ceramic mass in the form of neutralized silicic acid. Finally, the use of plastic materials for the intermediate layer is also advantageous, such as temperature-resistant two-constituent bonding agents.

As an advantageous further development of the invention, the intermediate layer has a thickness of 0.5-5 mm, preferably approximately 1 mm. As a result, it is ensured that the intermediate-layer material can be poured in well and with a low consumption of material.

Another advantage connected with the invention is the fact that the intermediate layer can be removed again by being melted out, and the interior shroud may be exchanged without changing the support shroud. The support or pressure housing may advantageously be manufactured from a high-strength and weight-reducing fiber composite such as carbon fiber/plastic, and carbon fiber/graphite.

Other objects, advantages and novel features of the present invention will become apparent from the following detailed description of the invention when considered in conjunction with the accompanying drawings.

BRIEF DESCRIPTION OF THE DRAWINGS

FIG. 1 is a longitudinal sectional view of a propelling nozzle;

FIG. 2 is a cutout of a nozzle shroud;

FIG. 3 is another cutout of the nozzle shroud;

FIG. 4 is a sectional view along line IV—IV of FIG. 1;

FIG. 5 is a sectional view along line V—V of FIG. 1; and

FIG. 6 is a sectional view along line VI—VI of FIG. 1.

DETAILED DESCRIPTION OF THE DRAWINGS

FIG. 1 is a longitudinal sectional view of a propelling nozzle 1 according to the present invention. The propelling nozzle 1 essentially comprises two half-shells of a nozzle shroud 2a and 2b which are screwed to one another in a manner not shown. The nozzle duct 3 changes in the transition section 4 from a round cross-section in Section IV—IV (FIG. 4), which is the combustion chamber area to a rectangular cross-section in Section V—V (FIG. 5). A rectangular contour also exists in the narrow cross-section VI—VI (FIG. 6) of the nozzle. Area 3d represents the expansion area of the propelling nozzle 1 in which there is also a rectangular cross-section.

Although the present invention is explained by means of the propelling nozzle 1 illustrated in FIG. 1, modifications are also naturally possible to provide nozzles having different cross-sections, such as barrel-shaped or oval cross-sections, without departing from the scope of the invention.

The two half-shells of the nozzle shroud 2a and 2b essentially comprise an interior shroud 5, which is penetrated by cooling ducts, and a support shroud 6 which encloses the interior shroud 5. Between the two shrouds 5 and 6, a relatively thin intermediate layer 7 is provided shown as a solid black line and which was cast in place.

FIG. 2 is a cross-sectional view of the nozzle shroud 2a along Line II—II according to FIG. 1 where the nozzle shroud 2a still has a round cross-section. As mentioned above, the nozzle shroud 2a includes the interior shroud 5 which consists of a material of high thermal conductivity. Regularly spaced grooves 8, which extend in the longitudinal direction of the nozzle, are let into the interior shroud 5. Supporting webs 9 remain between the grooves 8. These grooves 8, which are radially let into the interior shroud 5 from the outside, form the cooling ducts 8 as a result of the fact that the interior shroud 7 is enclosed by a thin covering 10 which is soldered, welded or galvanically provided on it or on the supporting webs 9 such that the cooling ducts 8 are closed in themselves.

Preferably, the covering 10 consists of the same material as the interior shroud 5. The relatively thick support shroud 6 is arranged on the outside. An approximately 1 to 2 mm gap remains between the interior shroud 6, or more specifically, between the covering 10 and the support shroud 6. This gap is completely filled in with a cast, pressure-proof intermediate layer 7.

FIG. 3 is a sectional view along Line III—III according to FIG. 1. The only difference in comparison to FIG. 2 is that, in the area of the sectional view according to FIG. 3, the nozzle shroud 2a has a rectangular cross-section such that the shown cutout extends in a straight line.

Sensors S, schematically depicted in FIG. 3, such as temperature sensing probes or pressure sensing probes are cast into the intermediate layer 7, without weakening the support shroud.

The propelling nozzle 1 according to the present invention is manufactured with an interior shroud 5 made of a heat conducting material. The interior shroud 5 is provided with cooling ducts 8 and is shaped into the intended final contour, and a support shroud 6 with a matched shape is mounted while a gap is maintained between the two shrouds 5 and 6. Subsequently, the gap is filled up. The cooling ducts may be worked in, for example, by means of milling.

The casting-in process is characterized in that the parts, i.e., the interior shroud 5 and the support shroud 6, are heated to the casting temperature of the material to be cast in. Subsequently, the cast-in mass is entered into a vacuum under pressure. Preferably, the casting takes place under the effect of vibrations in order to reliably fill in all hollow spaces.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A propelling nozzle for an aircraft engine, comprising:
    an interior shroud having a high thermal conductivity and including a plurality of cooling ducts penetrating said interior shroud;
    a solid support shroud outwardly surrounding said interior shroud; and
    a cast-in intermediate layer provided between said interior shroud and said support shroud, said cast in intermediate layer being removable by melting to thereby accommodate selective exchange and reuse of said support shroud with a different interior shroud.

2. A propelling nozzle according to claim 1, wherein said intermediate layer is made of a metal alloy.

3. A propelling nozzle according to claim 2, wherein said metal alloy includes one of bismuth and tin as its main constituent.

4. A propelling nozzle according to claim 1, wherein said intermediate layer is made of a ceramic mass.

5. A propelling nozzle according to claim 1, wherein said intermediate layer is made of a plastic mass.

6. A propelling nozzle according to claim 1, wherein said intermediate layer has a layer thickness of from 0.5 to 5 mm.

7. A propelling nozzle according to claim 2, wherein said intermediate layer has a layer thickness of from 0.5 to 5 mm.

8. A propelling nozzle according to claim 3, wherein said intermediate layer has a layer thickness of from 0.5 to 5 mm.

9. A propelling nozzle according to claim 4, wherein said intermediate layer has a layer thickness of from 0.5 to 5 mm.

10. A propelling nozzle according to claim 5, wherein said intermediate layer has a layer thickness of from 0.5 to 5 mm.

11. A propelling nozzle according to claim 1, further comprising sensors let into said intermediate layer for measuring nozzle characteristics.

12. A propelling nozzle according to claim 2, further comprising sensors let into said intermediate layer for measuring nozzle characteristics.

13. A propelling nozzle according to claim 3, further comprising sensors let into said intermediate layer for measuring nozzle characteristics.

14. A propelling nozzle according to claim 4, further comprising sensors let into said intermediate layer for measuring nozzle characteristics.

15. A propelling nozzle according to claim 5, further comprising sensors let into said intermediate layer for measuring nozzle characteristics.

16. A propelling nozzle according to claim 6, further comprising sensors let into said intermediate layer for measuring nozzle characteristics.

17. A process for manufacturing a complex shaped wall of a propelling nozzle, the process comprising the steps of:
supplying an interior shroud made of a heat-conducting material;
providing cooling ducts in the interior shroud;
shaping the interior shroud into an intended end contour;
mounting a support shroud having an adapted shape around the interior;
maintaining the gap between the interior and support shroud; and
filling the gap with an intermediate layer by casting, said cast in intermediate layer being removable by melting to thereby accommodate selective exchange and reuse of said support shroud with a different interior shroud.

18. A propelling nozzle according to claim 1, wherein said support shroud is constructed of a fiber-reinforced material.

19. A propelling nozzle according to claim 11, wherein said support shroud is constructed of a fiber-reinforced material.

20. A process according to claim 17, wherein the step of mounting a support shroud includes the step of forming the support shroud of a fiber reinforced material.

* * * * *